United States Patent [19]

Moser

[11] Patent Number: 4,740,261
[45] Date of Patent: Apr. 26, 1988

[54] EXTRUSION METHODS AND APPARATUS

[75] Inventor: Karen K. Moser, Omaha, Nebr.

[73] Assignee: American Telephone and Telegraph Company, AT&T Technologies, Inc., Berkeley Heights, N.J.

[21] Appl. No.: 912,029

[22] Filed: Sep. 25, 1986

[51] Int. Cl.⁴ .......................................... B29C 47/02
[52] U.S. Cl. .............................. 156/244.12; 156/54; 156/244.23; 156/500; 264/173; 264/174; 425/113; 425/114
[58] Field of Search ................. 264/174, 173; 156/54, 156/56, 244.12, 244.23, 244.13, 244.24, 244.14, 500; 425/113, 114

[56] References Cited

U.S. PATENT DOCUMENTS

| | | | |
|---|---|---|---|
| 3,087,007 | 4/1963 | Jachimowicz | 264/174 |
| 3,188,256 | 6/1965 | Shoemaker | 156/54 |
| 3,581,343 | 6/1971 | Henrikson et al. | 425/113 |
| 3,816,643 | 6/1974 | Pechhold | 156/54 |
| 3,841,810 | 10/1974 | Robinson et al. | 425/113 |
| 4,134,953 | 1/1979 | Dembiak et al. | 264/174 |
| 4,261,936 | 4/1981 | Hartig | 264/174 |
| 4,585,407 | 4/1986 | Silver et al. | 425/114 |
| 4,595,431 | 6/1986 | Bohannon, Jr. et al. | 156/244.23 |

FOREIGN PATENT DOCUMENTS

| | | | |
|---|---|---|---|
| 60-179219 | 9/1985 | Japan | 264/174 |
| 992469 | 5/1965 | United Kingdom | 425/113 |

Primary Examiner—Jeffery Thurlow
Attorney, Agent, or Firm—Edward W. Somers

[57] ABSTRACT

An extrusion apparatus for providing a plastic jacket (32) about an advancing cable core (23) which has been wrapped with a laminated metallic foil (76) includes dual core tubes. An inner one (86) of the core tubes extends into an extrusion chamber and has a free end portion (89) spaced from and disposed concentrically within an end portion (94) of an outer core tube (93). The foil, which is relatively cool and which functions as a shield (26), engages an inner wall of the inner core tube. This causes an overlapped longitudinal seam (78) of the shield to be maintained during the passage of the shielded cable core through the inner core tube. As a result, molten plastic material which is to form the jacket (32) is isolated thermally from the relatively cool shield and is prevented from being cooled prematurely prior to its being tubed about the advancing cable core.

9 Claims, 4 Drawing Sheets

EXTRUSION METHODS AND APPARATUS

TECHNICAL FIELD

This invention relates to extrusion methods and apparatus for providing a plastic jacket about a relatively small shielded cable core, such as a data communications cable. More particularly, this invention relates to methods and apparatus for causing a plastic jacket to be extruded about a laminated foil, which is used to enclose a core of so-called electronic communications cable.

BACKGROUND OF THE INVENTION

In many cables, it is customary to provide protection for a cable core, comprising a plurality of conductors, with a metallic shield. The metallic shield may be aluminum, which is used for lightning protection and protection from stray electromagnetic interferences, or it may be steel which is used to protect the cable from rodents, for example.

These shields are formed about the cable core as the cable core is advanced along a manufacturing line. Generally, the shield is formed with an overlapped longitudinal seam, which is such that the edge portions which provide the seam remain in place as the formed shield is moved with the cable core.

Afterwards, it is customary for the shielded core to be advanced through a passageway of a core tube of an extruder where a plastic jacket is provided about the shield. Generally, the passageway of the core tube of the extruder through which the shielded core is advanced is slightly larger than the outer diameter of the shield and is defined by an inner wall of the core tube.

As it is advanced through the core tube of the extruder, the shield with its overlapped seam remains in place about the cable core because of the method of forming the overlapped seam and because of the thickness of the shield material.

In the recent past, a new line of communications cables, which are referred to as electronic communications cables, have been made available to the marketplace. Generally, these kinds of cables are small pair size cables, involving, for example, only two to five plastic insulated metallic conductor pairs of twisted or untwisted conductors. Around the pairs of conductors in one such cable is placed a polyester tape for dielectric protection and a shield in the form of a laminated metallic foil. The laminated foil is relatively thin and an overlapped longitudinal seam of the shield which is formed along a manufacturing line must be maintained in place as the shielded core is advanced through the extruder which causes a plastic jacket to be tubed about the shielded core. Otherwise, the electrical characteristics of the cable may be affected adversely.

The maintenance of the shield configuration is accomplished generally by sizing the passageway of the core tube of the extruder through which the shielded core is advanced to be substantially the same size as the outer diameter of the shielding foil. As a result, the overlapped seam is maintained in place by the core tube up to a point just prior to the contact of the plastic extrudate with the foil.

This arrangement presents some problems in that the relatively cool metallic foil which is wrapped about the cable core just ahead of the core tube engages the inner diameter wall of the core tube and functions as a heat sink. As a result, the tip of free end of the core tube assumes a relatively cool temperature and some of the plastic material which comprises the extrudate begins to solidify prematurely on it. The result is a somewhat irregularly shaped jacket or jacket with unsightly defects in the outer surface thereof which is formed about the shielded cable core.

A further problem in the production of a relatively small electronic communications cable relates to the accumulation of air from the cable moving along the manufacturing line at a relatively high speed. As pressure builds up within the extruder, there is a problem in exhausting the air inasmuch as the core tube is sized so tightly about the shielding foil.

What is needed and what does not appear to be in the prior art are methods and apparatus for extruding a plastic jacket about a relatively small cable, which includes a laminated foil type of shield. Such methods and apparatus should also provide for the exhaustion of pressurized air and vapors that build up between the extrudate and the cable, notwithstanding the contiguous relationship of the foil with the inner wall of the core tube.

SUMMARY OF THE INVENTION

The foregoing problems have been overcome by the methods and apparatus of this invention. A method of extruding a plastic jacket about a relatively small cable, having a shield comprising a laminated metallic foil shield, includes advancing the shielded core in a direction along a path of travel and into an entrance of an extruder. The extruder is such that it includes a dual core tube with an inner core tube having a passageway therethrough which has a transverse cross section that is substantially the same as that of the incoming shielded core. An end portion of the outer core tube is disposed concentrically about the inner core tube and spaced therefrom to provide a relatively small annular space between the inner and outer core tubes at the unsupported ends of the core tubes within a die opening. As the relatively cool foil-shielded core is moved through the passageway of the inner core tube, it engages an inner wall which defines the passageway of the inner core tube and the unsupported tip end thereof. However, inasmuch as the inner core tube is spaced from the outer core tube and the plastic extrudate engages the outer core tube, the heat sink effect of the relatively cool foil shield does not cause premature cooling of the extrudate. As a result, imperfections in the outer surface of the plastic jacket are avoided.

An apparatus of this invention includes facilities for moving a cable core comprising a plurality of pairs of insulated conductors along a path of travel, and facilities for causing a laminated foil to be wrapped around the advancing core to form a shield having a longitudinal overlapped seam. The apparatus also includes an extruder which includes an inner core tube having a passageway through which the shielded core is advanced and an outer core tube which is disposed concentrically about the inner core tube and spaced therefrom at free ends of the core tubes. The core tubes extend into a die opening of an extruder crosshead and are spaced radially of the path of travel from a land of the die opening to permit plastic material which is to form the jacket about the shielded core to be flowed between a die chamber wall and an outer wall of the outer core tube, through the die and to cover the shielded cable core. Cooling facilities cool the jacket and a take-up is provided for the cooled, jacketed shielded core.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
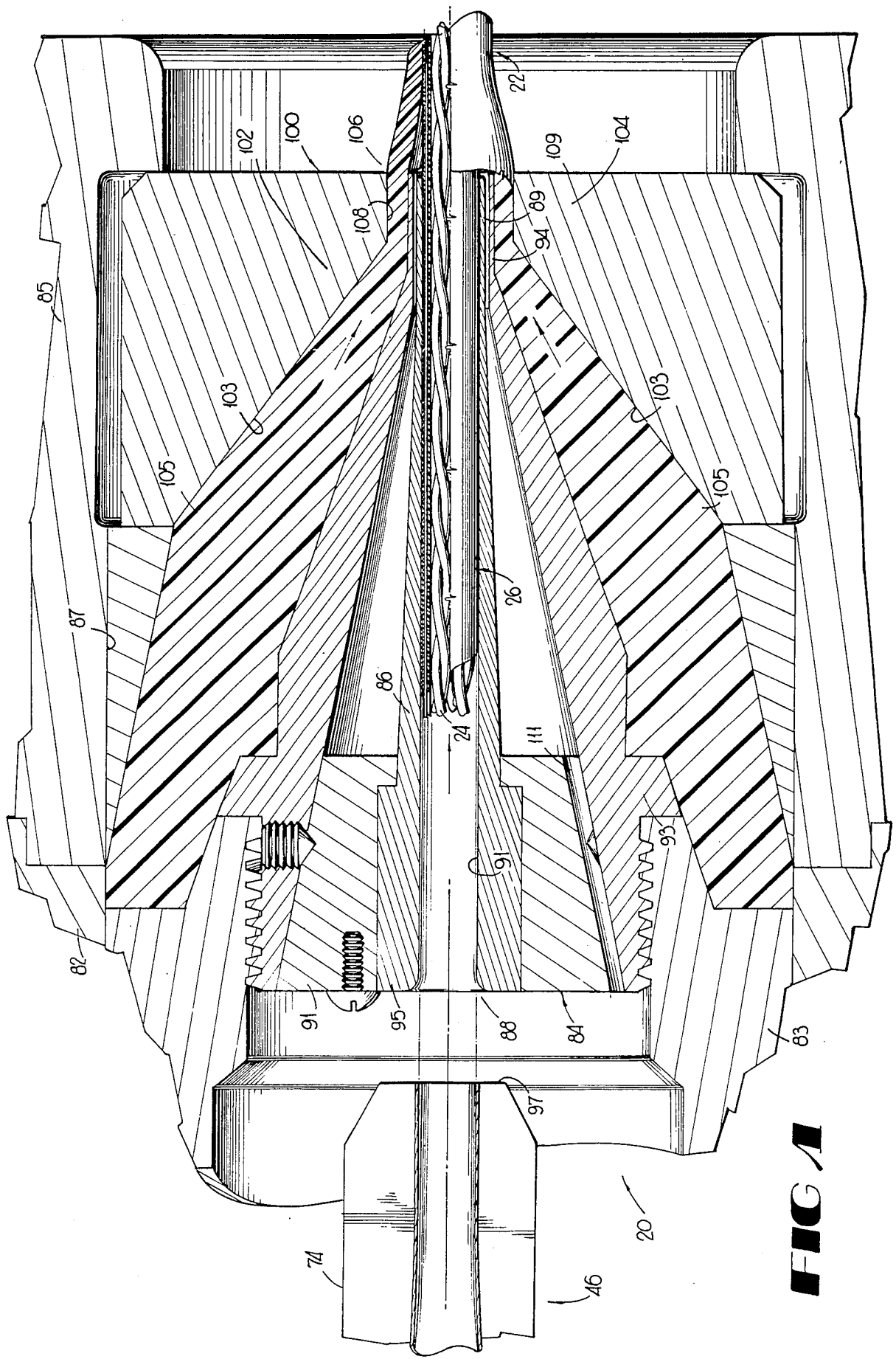
FIG. 1 is a plan view in section of a portion of an extruder which shows a dual core tube arrangement for use in the manufacture of a relatively small cable.
Figure 2:
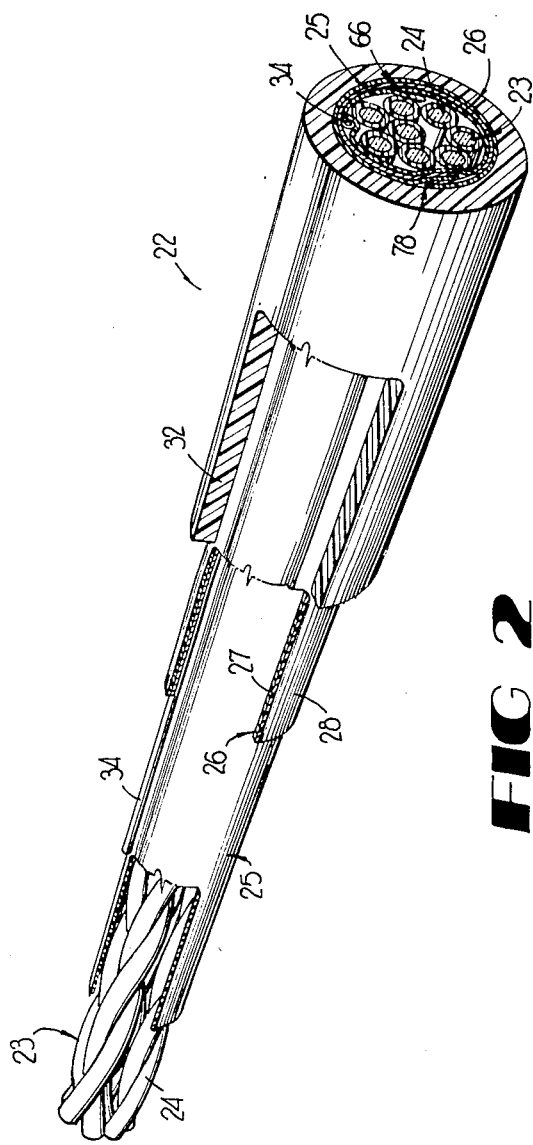
FIG. 2 is a perspective view of a shielded cable which is manufactured in accordance with the methods and apparatus of this invention.

Referring now to FIG. 1, there is shown an extruder crosshead which is designated generally by the numeral 20 and which is used in the manufacture of a cable 22 such as that shown in FIG. 2. The cable 22 which is shown in FIG. 2 is referred to as a small pair size cable and includes a core 23 which, typically, comprises two to five pairs of individually insulated conductors 24—24 of a gauge size in the range of 19 to 26 AWG with each pair being twisted together. The pairs of conductors 24—24 are enclosed in a relatively thin core wrap 25 comprising polyester plastic for example, and having a thickness of about 0.001 inch. About the polyester core wrap, which provides dielectric protection for the core 23, is disposed a shield 26. The shield 26 is formed from a laminated foil in tape form comprising a metallic layer 27 and a plastic layer 28. Each layer of the shield 26 has a thickness of about 0.001 inch. In a preferred embodiment, the plastic layer of the shield comprises a polyester film. Further, in the preferred embodiment, the laminated foil is wrapped about the core 23 such that the metallic layer 27 faces inwardly.

As can be seen in FIG. 2, both the core wrap 25 and the shield 26 are disposed about the cable core 23 such that each has a longitudinal overlapped seam. Generally, the seams are both in the same quadrant, however, the wrappings of the core wrap and of the laminated foil tape are of opposite hand. This is done so that the inner edge portion of one will not snag on the outer edge portion of the other and tend to cause it to open.

The shielded core is enclosed in a jacket 32 (see again FIG. 2) which is made of a plastic material. Typically the plastic material of the jacket comprises a polyvinyl chloride (PVC) composition whereas the plastic insulation for the conductors in a preferred embodiment is polypropylene. Also, typically, the wall thickness of the jacket 32 is about 0.020 inch whereas the wall thickness of the plastic insulation about each conductor is about 0.008 inch.

It should be observed from the drawing that the cable 22 includes a drain wire 34. The drain wire 34 is interposed between the shield 26 and the dielectric core wrap 25 and carries stray electromagnetic currents to ground. As mentioned hereinbefore, the shield 26 is disposed about the cable core 23 with the metallic layer thereof facing inwardly. In this way, the metallic portion of the shield 26 is in engagement with the drain wire 34.

The cable 22 of FIG. 2 is one of a family of cables which are referred to as electronic communications cables. A so-called electronic communications cable is disclosed and claimed in U.S. Pat. No. 4,510,346 which issued on Ap. 9, 1985 in the names of T. P. Bursh, Jr., D. I. Davis, J. T. Slominski and R. K. Swartz.

Figure 3:
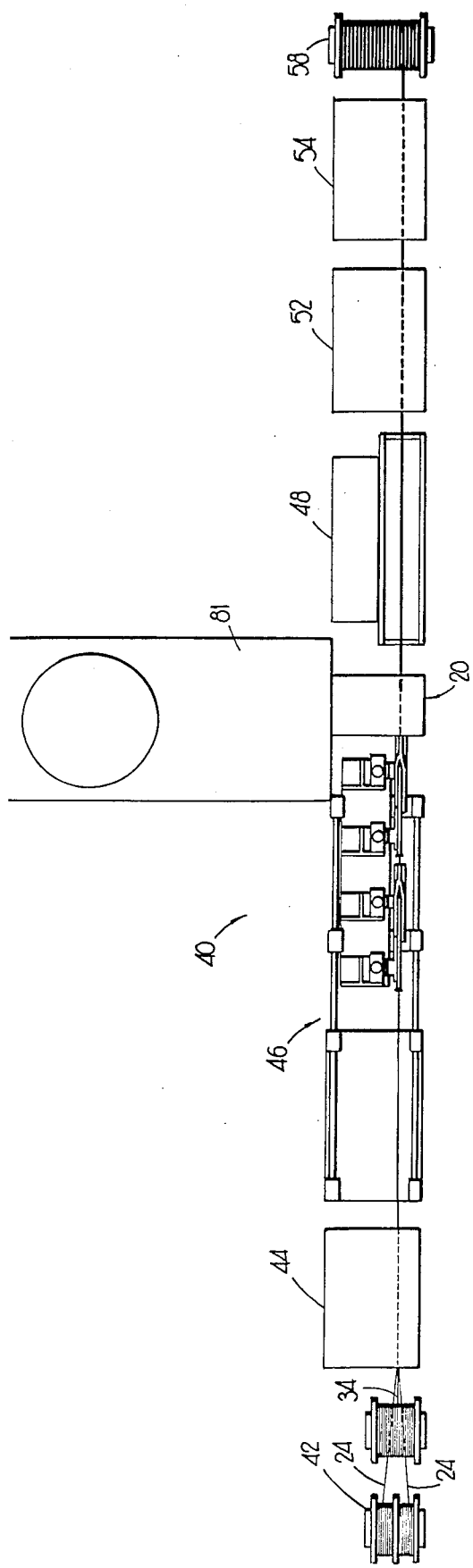
FIG. 3 is a schematic view of a manufacturing line for making the product of FIG. 2.

The extrusion crosshead 20 is provided along a manufacturing line which is shown in FIG. 3 and which is designated generally by the numeral 40. As can be seen, pairs of the insulated conductors 24—24 are payed off from supplies 42—42 and advanced through a splicing apparatus 44, a forming station 46 and the extruder crosshead 20 which causes the plastic jacket to be formed about the shielded cable core. From the extruder crosshead 20, the cable 22 is moved through a cooling trough 48 by a drum type capstan 52. Afterwards, the cable jacket is marked by a printing device 54 and the cable is passed through an accumulator (not shown) onto a takeup reel 58.

Figure 4:
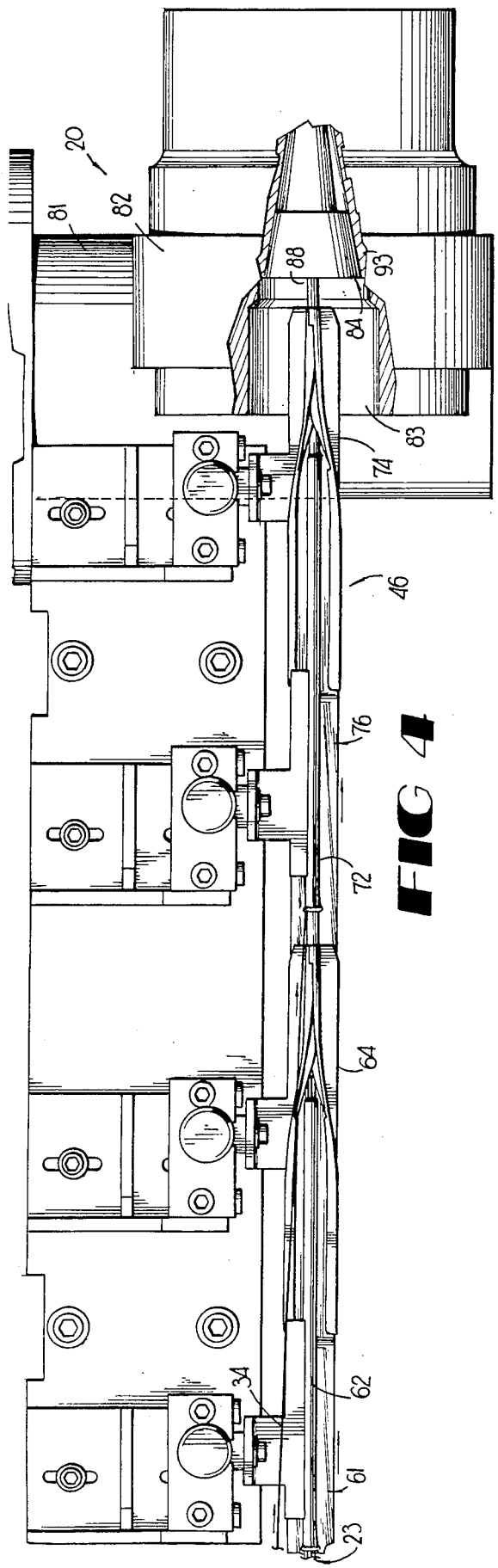
FIGS. 4 and 5 are plan and elevational views, respectively, of a forming station whereat a laminated foil tape is caused to be wrapped about an advancing cable core.
Figure 5:
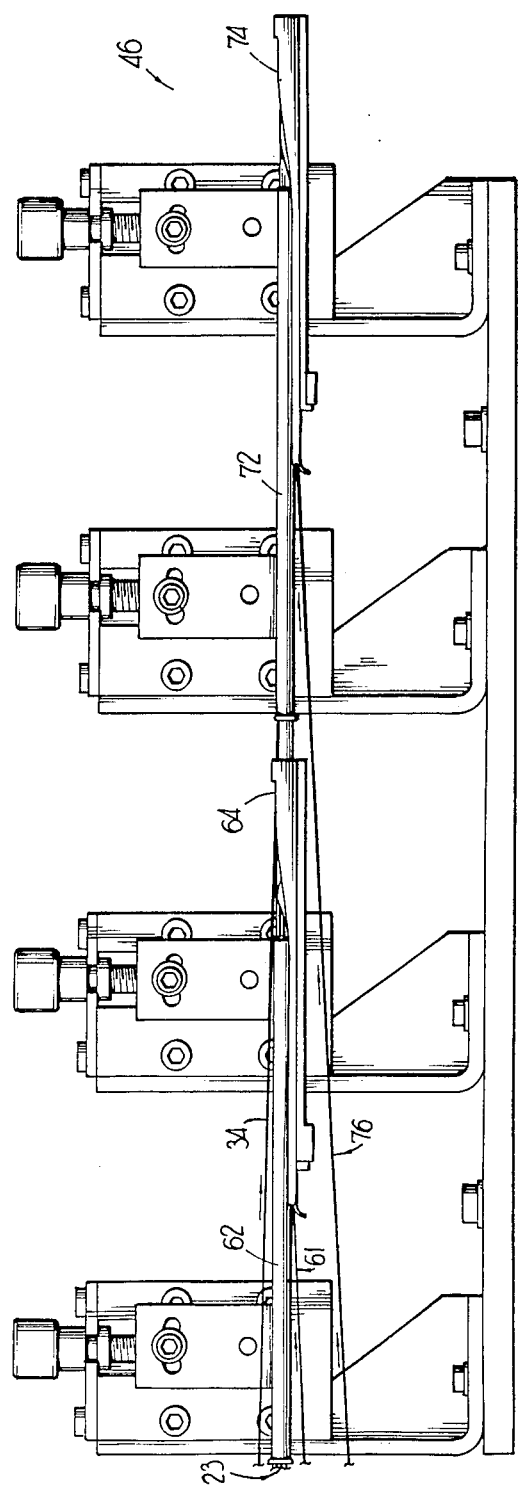

Going now to FIGS. 4 and 5, there are shown plan and elevational views, respectively, of the forming station 46 in which a tape 61 of polyester film is formed onto the advancing core wrap 23 and a tape comprising a plastic-metallic laminate is formed into the shield 26. The pair or pairs of insulated conductors 24—24 are moved first through a hold-down tube 62 while the tape 61 of the polyester film is advanced into juxtaposition with a first forming tool 64. Tools such as the one designated 64 for causing a tape to be wrapped about an advancing cable core and to be provided with a longitudinal overlapped seam are well known in the art. As the core 23 is moved through the first forming tool 64, the tape 61 is caused to be controlled by the forming tool 64 to become wrapped about successive increments of length of the cable core. The first forming tool 64 wraps the tape 61 about the cable core to provide the core wrap 25 and such that the tape is caused to have a longitudinal overlapped seam 66 (see FIG. 2).

Afterwards, the core 23 enclosed by the core wrap 25 is moved into and through a hold-down tube 72 which is sized to have an inner diameter substantially equal to the outer diameter of the core wrap 25. The hold-down tube 72 maintains the overlapped seam 66 as each successive section of the enclosed core 23 is advanced into engagement with a second forming tool 74. At the same time, a tape 76 which comprises a laminated foil of metal and plastic, is advanced into juxtaposition with the forming tool 74 such that each successive increment of its length is brought into juxtaposition with an increment of length of the enclosed core that emerges from the second hold-down tube 72. The second forming tool 74 controls and guides the edge surfaces of the tape 76 of laminated foil to cause successive increments of its length to be wrapped about the enclosed core to form the shield 26 with a longitudinal overlapped seam 78 (see FIG. 2).

The orientation of the overlapped seems of the polyester core wrap tape 61 and of the metallic laminated foil tape 76 is important. Although they could be formed so that they are in the same quadrant, it is important that these overlapped seams be formed in opposite hand directions. That is, the free inner edge portion of the outer tape 76, should be extending in the same circumferential direction as the outer edge portion of the inner tape 61. Otherwise, the outer edge portion of the polyester tape 61 could extend into the seam 78 of the outer tape 76 and tend to open that seam.

After successive increments of length of the shielded core are advanced out of the forming apparatus 46, they are advanced into the extruder crosshead 20. The extruder crosshead 20 which is provided plastic extrudate from a barrel 81 (see FIG. 3) includes a housing 82 (see FIG. 1) from which is supported a diverter tube 83 and a die holder 85.

From the diverter tube 83 and into a chamber 87 of the die holder 85 extends a core tube arrangement which is designated generally by the numeral 84. The core tube arrangement 84 includes an inner core tube 86 having a cable core entry end 88 and an unsupported cable core exit or free end portion 89. At the cable core entry end 88, an end portion 95 of the inner core tube is mounted in an end block 91 having a truncated conical shape. Disposed about an outer surface of the end block 91 is an end portion of an outer core tube 93. The outer core tube 93 in the vicinity of the end block 91 is conically shaped and extends toward the free end portion 89 of the inner core tube 86. An unsupported free end portion 94 of the outer core tube 93 is cylindrically shaped having a wall disposed concentrically about and spaced in a direction radially of the path of travel of the cable core from the exit end portion 89 of the inner core tube 86 (see also FIG. 6).

Such extruder arrangements are well known in the art. See, for example, U.S. Pat. No. 3,579,608 which is incorporated by reference hereinto.

It should be observed from FIG. 1 of the drawings that an exit end 97 of the forming apparatus 46 is spaced a relatively short distance from the core entry end 88 into the inner core tube 86. In a preferred embodiment, this distance is about 0.375 inch. This is done to minimize the unsupported distance through which the shielded core is moved prior to the plastic jacket being formed thereover.

Further, the transverse cross section of a passageway 91 through the inner core tube is substantially the same as the transverse cross section of the shielded cable core. For the cable 22, the inner diameter of the inner core tube 86 is sized to be equal substantially to the outer diameter of the shielded core. For example, for a five pair, 24 gauge cable core, the diameter over the shield 26 is about 0.190 inch and the inner diameter of the passageway 91 of the inner core tube 86 is about 0.190 inch. These arrangements are made in order to maintain the shield 26 wrapped tightly about the taped core with its seam 78 overlapped. Otherwise, the electrical characteristics of the cable may be affected adversely. In a conventional extruder, there is normally about 0.030 to 0.060 inch clearance between the passageway throught the core tube and the cable core which allows air to flow rearwardly to relieve the pressure between the extrudate and the cable. In the arrangement of this invention, such a clearance, which permits the overlapped seam on the cable core shield 26 to be maintained, is not provided.

As can be seen in FIG. 1, the die holder 85 of the extruder crosshead 20 extends forwardly in the direction of the path of travel of the core 23 to provide support for a die 100. The die 100 includes a conically shaped wall 102 which cooperates with the outer surface of the outer core tube 93 to provide a flow passage 103 for a plastic extrudate 105.

The die 100 terminates in a wall 104 having an opening 106 formed by a surface which is referred to as a land 108. The free end portions 89 and 94 of the inner and the outer core tubes 84 and 93, respectively, extend into the opening 106 and are substantially flush with an outer surface 109 of the die land. The plastic extrudate flows along the passage 103 and between the land 108 and the outer core tube and out of the extruder. As the core 23 is advanced out of the extruder, the plastic is drawn down or tubed about the advancing shielded core.

As mentioned hereinbefore, it is important to maintain the relatively cool shield 26 spaced from the extrudate until after the extrudate is disposed about the shielded core. If this is not done, the shield acts as a heat sink and the extrudate at the unsupported end of the outer core tube 93 cools prematurely causing irregularities in the plastic jacket 32.

Figure 6:
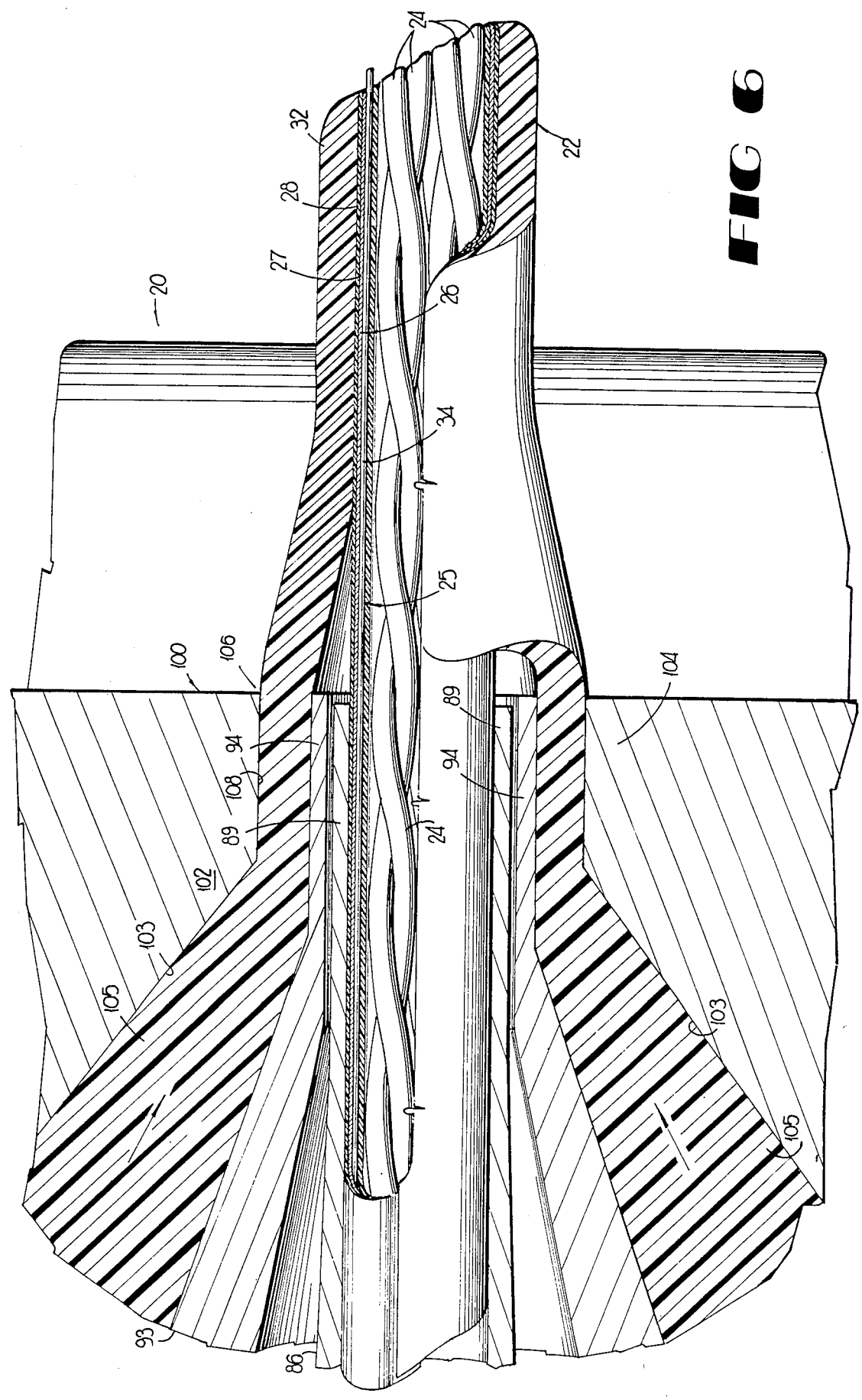
FIG. 6 is an enlarged view of a portion of the extruder of FIG. 1.

This problem is overcome herein by using the dual core tube arrangement comprising the inner core tube 86 and the outer core tube 93. Further, as is seen in FIGS. 1 and 6 of the drawings, the free end portion 94 of the outer core tube is spaced radially a distance from the free end portion of the inner core tube at the free end portions thereof. In the preferred embodiment, this distance is about 0.010 inch. As a result, the metallic shield 26 which acts as a heat sink is in engagement with the inner core tube 86 only and the extrudate is spaced therefrom. In a conventional core tube arrangement, because there is a clearance between the core tube and the shield, the shield does not act as a heat sink to extract heat from the extrudate because it is spaced therefrom. But with the relatively small diameter cable being processed herein, the relatively cool shield must be in tight engagement with the core tube to maintain the shield configuration thereby rendering it an effective heat sink.

The clearance between the inner and the outer core tubes isolates thermally the metallic shield 26 from the extrudate. Advantageously, this prevents the premature cooling of the extrudate as it begins to be tubed down about the advancing cable core. This prevents the formation of imperfections in the plastic jacket 32.

The clearnce between the land 108 and the outer surface of the outer core tube 93 may be varied. Its value is a function of the thickness of the plastic jacket 32 and the so-called draw-down ratio. If the draw-down ratio is too high, holes in the jacket 32 appear because the plastic material on the outside of the cable core is not traveling as fast as that adjacent to the cable core.

As mentioned hereinbefore, air which is at an elevated pressure in and around the core tubes must be provided an escape. This is accomplished by air passages 111—111 between the end block 91 and the outer core tube 93. In the preferred embodiment of this invention, three such ports are provided.

Also, the end portion 89 of the inner core tube 84 can be recessed from the unsupported end 94 of the outer core tube 93 (see FIGS. 1 and 6). This lessens the chance for the plastic extrudate to enter the clearance between the end portions of the core tubes.

Whereas the methods and apparatus of this invention have been described to be used to provide a plastic jacket about a shielded cable core having a circular cross section transverse of a longitudinal axis of the cable, they may have other uses. For example, the dual core tube arrangement may be used to jacket a shielded cable core having an oval configuration.

It is to be understood that the above-desribed arrangements are simply illustrative of the invention.

Other arrangements may be devised by those skilled in the art which will embody the principles of the invention and fall within the spirit and scope thereof.

What is claimed is:

1. A method of causing a plastic jacket to be extruded about an advancing cable core which is enclosed by a metallic shield having a longitudinal overlapped seam, said method comprising the steps of:

advancing a cable core enclosed by a metallic shield which has a longitudinal overlapped seam and which is relatively cool along a path of travel through a passageway of an inner core tube having a cross-section transverse of the path of travel and along its length which is substantially the same as that of the shielded cable core; and moving a molten plastic material along a flow path adjacent to the inner core tube toward and through a die to provide a jacket about the shielded cable core; while providing an outer core tube having an end portion which is disposed concentrically about an end portion of the inner core tube with an outer surface of the inner core tube being spaced radially of the path of travel from an inner surface of the outer core tube to isolate thermally a free end of the inner core tube which is substantially in engagement with the relatively cool shield from the molten plastic material to prevent the plastic material from cooling prematurely prior to its being tubed about the advancing cable core thereby avoiding the formation of imperfections in the cable jacket.

2. The method of claim 1, wherein said step of providing an outer core tube includes spacing a free end of the inner core tube from a free end of the outer tube in a direction along the path of travel.

3. The method of claim 1, which also includes the step of providing a flow path for gaseous material from the free end portion of said inner core tube to ambient atmosphere.

4. Apparatus for causing a plastic jacket to be extruded about an advancing cable core which is enclosed by a metallic shield, said apparatus comprising:

support means which includes a chamber;

an inner core tube which extends into said chamber and which includes a passageway through which the shielded cable core is adapted to be advanced, the passageway being circular and having a diameter which is substantially the same as that of the shielded cable core;

an outer core tube which extends into said chamber and which is disposed concentrically about said inner core tube along an inner end portion thereof to provide an annular spacing between an outer surface of said inner core tube and an inner end surface of said outer core tube; and die means spaced from said outer core tube radially of said passageway at an end of said chamber for allowing passage therethrough of the plastic material which has been flowed in said chamber between a wall of said chamber and said outer core tube while the shielded cable core is being advanced through the passageway to cause the plastic material to be tubed about the advancing shielded cable core externally of said die means.

5. The apparatus of claim 4, wherein the spacing between the inner surface of said outer core tube and the outer surface of said inner core tube provides a flow path for air to relieve any pressure buildup adjacent to an end of said outer core tube, said apparatus also including a plurality of ports which communicate the spacing between the core tubes to ambient atmosphere.

6. The apparatus of claim 4, wherein a free end of said inner core tube is recessed from a free end of said outer core tube.

7. The apparatus of claim 4, wherein said inner core tube is spaced radially of said passageway from said outer core tube a distance of about 0.010 inch.

8. An apparatus for making a cable which comprises a core comprising at least one conductor, a metallic shield which encloses the core and a plastic jacket which encloses the shield, said apparatus comprising:

supply means for providing successive increments of length of the cable core;

means for advancing the cable core along a path of travel;

an extrusion chamber;

means for supplying a length of metallic tape and for moving sucessive increments of length of the tape into juxtuposition with the advancing cable core;

forming means interposed between said supply means and said extrusion chamber for causing successive increments of length of the metallic tape to be wrapped about the advancing cable core such that the tape is formed into a shield having a longitudinal overlapped seam;

die means which is mounted in said chamber and which includes an opening being adapted to allow passage therethrough of the cable core and the plastic material that has been flowed in said chamber to cause the plastic material to be tubed about the cable core externally of said die means;

an inner core tube which extends into said chamber and which includes a passageway through which the cable core is adapted to be advanced with an unsupported end portion of said inner core tube extending into the opening in said die means, the passageway having a diameter which is substantially the same as that of the shielded cable core, said forming means having a portion which extends into close proximity to an entrance of said inner core tube to cause the overlapped seam to be maintained as it is advanced from said forming means into the inner core tube;

an outer core tube which extends into said chamber and which has an unsupported end portion that extends into the opening in said die means and that is disposed concentrically about said inner core tube along an inner end portion thereof to provide an annular spacing between an outer surface of said inner core tube and an inner end surface of said outer tube and an annualar spacing between an outer surface of said outer core tube and said die means to allow passage of the platic material between the outer core tube and said die means to facilitate tubing of the plastic material about the advancing cable core externally of said die means;

means for cooling the plastic material; and means for taking up the enclosed cable core.

9. The apparatus of claim 8, wherein said die means includes a land and portions of said core tubes are spaced from said land in a direction radially of a longitudinal axis of said extrusion chamber.

* * * * *